United States Patent
Aoun et al.

(10) Patent No.: US 10,993,163 B2
(45) Date of Patent: Apr. 27, 2021

(54) OPTIMIZING MESSAGE FORWARDING IN A WIRELESS MESH NETWORK

(71) Applicant: SIGNIFY HOLDINGS B.V., Eindhoven (NL)

(72) Inventors: Marc Aoun, Eindhoven (NL); Daniel Martin Goergen, Eindhoven (NL); Tim Corneel Wilhelmus Schenk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1100 days.

(21) Appl. No.: 14/759,817

(22) PCT Filed: Dec. 31, 2013

(86) PCT No.: PCT/IB2013/061446
§ 371 (c)(1),
(2) Date: Jul. 8, 2015

(87) PCT Pub. No.: WO2014/108786
PCT Pub. Date: Jul. 17, 2014

(65) Prior Publication Data
US 2017/0181053 A1    Jun. 22, 2017

Related U.S. Application Data

(60) Provisional application No. 61/749,997, filed on Jan. 8, 2013.

(51) Int. Cl.
*H04W 40/02* (2009.01)
*H04W 28/02* (2009.01)
(Continued)

(52) U.S. Cl.
CPC ........... *H04W 40/02* (2013.01); *H04W 24/02* (2013.01); *H04W 28/0226* (2013.01);
(Continued)

(58) Field of Classification Search
CPC combination set(s) only.
See application file for complete search history.

(56) References Cited

U.S. PATENT DOCUMENTS 7,835,351 B2 *  11/2010  Mosko .................. H04L 67/327
                                                    370/389
8,193,929 B1 *   6/2012  Siu ......................... H04L 67/12
                                                    340/538
(Continued)

FOREIGN PATENT DOCUMENTS

CN          101099346 A      1/2008
CN          102307417 A      1/2012
(Continued)

OTHER PUBLICATIONS

De Couto, Douglas S. J., et al., "Location Proxies and Intermediate Node Forwarding for Practical Geographic Forwarding," MIT Laboratory for Computer Science Technical Report, MIT-LCS-TR-824, June 2001 (14 Pages).
(Continued)

*Primary Examiner* — Yee F Lam
(74) *Attorney, Agent, or Firm* — Meenakshy Chakravorty

(57) ABSTRACT

For ensuring reliability of data transmission in a wireless mesh network, while reducing the data overhead of the transmissions, a node for a wireless mesh network and a method of controlling the same are provided, wherein the node is configured to decide about retransmission of a message received from a transmitting node, based on whether the transmitting node has at least one layout element of a layout plan in common with the node, at least one of the layout elements of the layout plan being associated with the node.

20 Claims, 8 Drawing Sheets

(51) Int. Cl.
*H04W 24/02* (2009.01)
*H04W 84/18* (2009.01)
*H05B 47/19* (2020.01)

(52) U.S. Cl.
CPC ........ *H04W 28/0273* (2013.01); *H05B 47/19* (2020.01); *H04W 84/18* (2013.01)

(56) References Cited

U.S. PATENT DOCUMENTS

| | | | | |
|---|---|---|---|---|
| 9,614,964 | B2* | 4/2017 | Stepanian | H04N 21/42201 |
| 2005/0226201 | A1* | 10/2005 | McMillin | H04W 88/04 |
| | | | | 370/348 |
| 2005/0268629 | A1* | 12/2005 | Ahmed | F24F 11/30 |
| | | | | 62/201 |
| 2010/0201267 | A1* | 8/2010 | Bourquin | H05B 47/105 |
| | | | | 315/32 |
| 2012/0003921 | A1 | 1/2012 | Scopigno et al. | |
| 2012/0242501 | A1* | 9/2012 | Tran | A61B 5/7465 |
| | | | | 340/870.02 |
| 2012/0275373 | A1* | 11/2012 | Takahashi | H04W 4/40 |
| | | | | 370/315 |
| 2013/0099941 | A1* | 4/2013 | Jana | G08G 1/093 |
| | | | | 340/905 |
| 2014/0038511 | A1* | 2/2014 | Hall | H04W 4/029 |
| | | | | 455/3.01 |

FOREIGN PATENT DOCUMENTS

| | | |
|---|---|---|
| JP | 2009217593 A | 9/2009 |
| WO | 2008029164 A2 | 3/2008 |
| WO | 2011023904 A1 | 3/2011 |
| WO | 2011145027 A1 | 11/2011 |
| WO | 20120140610 A1 | 10/2012 |

OTHER PUBLICATIONS

Kevin C. Lee et al, "Taking the Louvre Approach", IEEE Vehicular Technology Magazine, Mar. 2009, pp. 86-92.

* cited by examiner

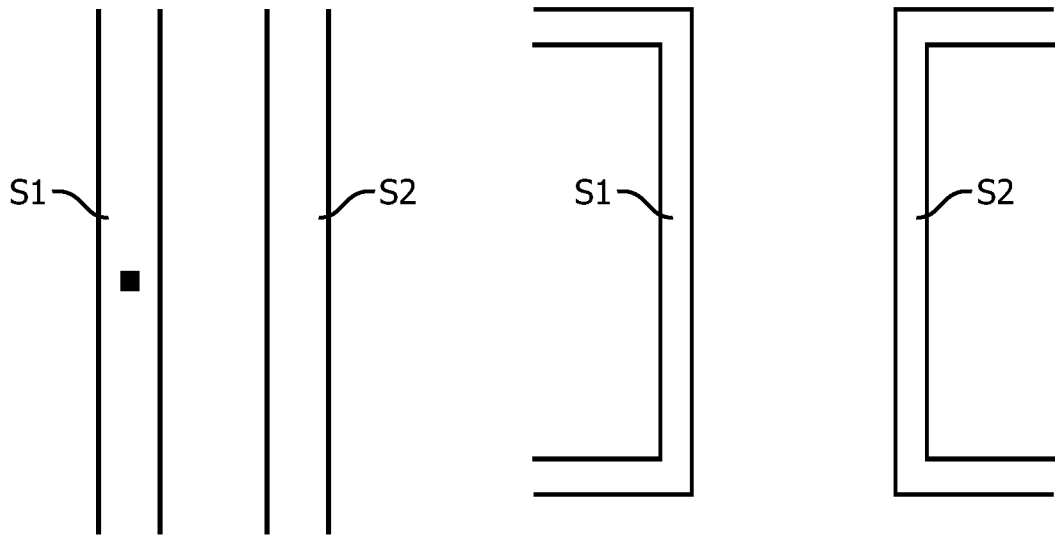
FIG. 5A
FIG. 5B
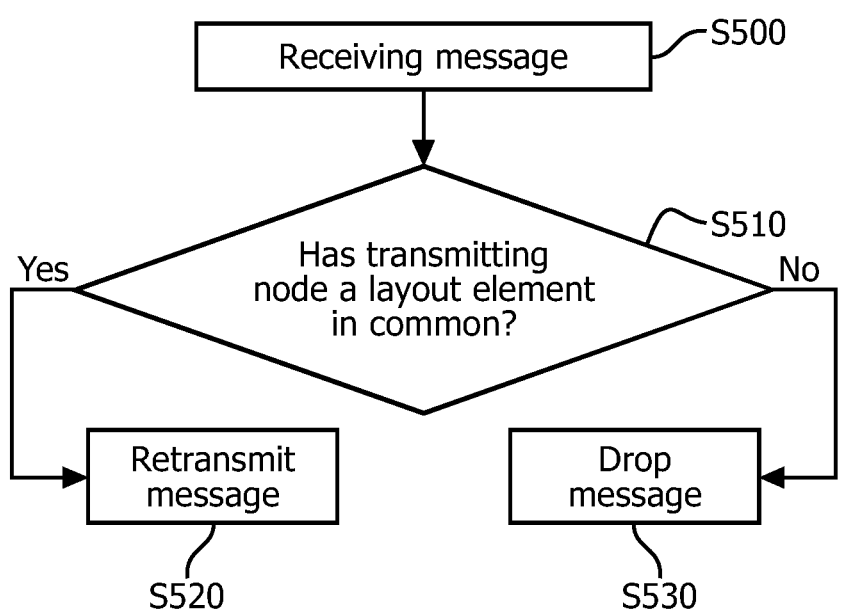
FIG. 6A

OPTIMIZING MESSAGE FORWARDING IN A WIRELESS MESH NETWORK

CROSS-REFERENCE TO PRIOR APPLICATIONS

This application is the U.S. National Phase application under 35 U.S.C. § 371 of International Application No. PCT/IB2013/061446, filed on Dec. 31, 2013, which claims the benefit of U.S. Provisional Patent Application No. 61/749,997, filed on Jan. 8, 2013. These applications are hereby incorporated by reference herein.

FIELD OF THE INVENTION

The invention relates to a node for a wireless network and a method of operating the same, both particularly suited for use in a wireless mesh network.

BACKGROUND OF THE INVENTION

Nowadays, wireless mesh networks are employed more and more, e.g. for remote control (telemanagement) of illumination systems, building automation, monitoring applications, sensor systems and medical applications. In particular, management of outdoor luminaires such as street lighting becomes increasingly important, since illumination systems set up as wireless mesh networks allow for more energy-efficient operation, e.g. by adapting the illumination to the actual requirements.

In applications such as light-on-demand, a sensor unit of a luminaire node is triggered, e.g. when an object is detected. This node will be referred to as triggered node. In response to the trigger event, an actuation step is performed by the node, e.g. the lighting unit of the luminaire is turned on. In addition, the triggered node informs direct and/or indirect neighbor nodes of the presence of the object by transmitting a trigger message using wireless node-to-node communication, so that neighbor nodes can perform the actuation step as well. Thus, the decision whether to perform the actuation step can be left to an application layer of these nodes.

Depending on how many neighbor nodes the triggered node has, how many hops or how far in geographical distance a detection message is required to travel, and on the communication protocols used, a single detection can result in a significant number of transmissions of the same message. In wireless mesh networks used for these applications, messages are delivered from a sender node to a receiver node through the use of intermediate nodes. This is usually achieved by a routing protocol or flooding. When flooding is used as the communication protocol at the network layer, every single node that receives the message will forward it further. This may be limited to cases in which the node receives this message for the first time and a hop count/geographical distance limit is not yet reached. Assuming, as an example, that a generated message is required to travel two hops from the triggered node, and that the latter has 20 neighbor nodes (a rather conservative estimate of reality), the message will be transmitted 21 times in total. Thus, using simple flooding, in principle, every node in a geographical scope has to (re)transmit a message, even when such a transmission would not reach additional nodes. This is a waste of bandwidth, limiting the maximum size of a network in terms of nodes.

Thus, transmission optimization is critical in systems where multiple nodes share a communication medium, e.g. for throughput performance and congestion reduction. It is also of high importance in systems where regulations regarding transmissions forbid nodes to transmit at will (duty-cycling regulations, e.g. a node is not allowed to occupy the communication channel for more than 1% of an hour). Hence, due to regulations that limit the percentage of time a node is allowed to use the wireless medium, it becomes important to reduce the number of transmissions per node. Moreover, too many transmissions will create lower transmission success rates, due to the occurrence of collisions. Additionally, it is of importance that at least the required set of lamps are actuated for user experience and safety. In the optimal case, only this set of lamps should be actuated. The reduction in transmissions should thus not come at the cost of application performance. While optimizations have been proposed, these require an exchange of relatively large amounts of information, which would be prohibitive in dense networks.

"Taking the Louvre approach" (Kevin C. Lee et al., The Vehicular Technology, March 2009) describes a routing solution using landmark overlays for urban vehicular routing environments, wherein link state table information is used for routing between overlay nodes represented by junctions.

SUMMARY OF THE INVENTION

In view of the above disadvantages and problems in the prior art, it is an object of the present invention to provide a node for a wireless mesh network and a method of controlling the same, wherein reliability of data transmission in the wireless mesh network is ensured, while data overhead of the transmissions is reduced.

The invention is based on the idea to use topological, functional and/or application-specific aspects for a forwarding decision at a receiving node. In particular, topological information of a node may be used in order to decide about a retransmission of a received message by this node. This topological information may refer to local information about the neighborhood of the node. In the example of an outdoor lighting system, this may refer to at least part of a city map. These means enable simple transmission protocols, e.g. flooding, broadcasting or multicasting, to be optimized, without necessarily using a link-based transmission strategy. Thus, the forwarding overhead can be reduced, e.g. as it may occur in a triggered node-to-node communication setting.

According to one aspect of the present invention, a node for a wireless network is provided, which is associated with at least one layout element of a layout plan, wherein the node is adapted to decide about whether or not to forward a message, e.g. a trigger message, received from a transmitting node, based on one or more layout elements of the layout plan that the transmitting node has in common with the node. Preferably, most or all nodes of the network have at least one layout element associated therewith. The layout plan may relate to a spatial arrangement of the network. For instance, for a street lighting system or a lighting system of a building, the layout plan may include a city map, a plant layout and/or a floor plan. Accordingly, the plurality of layout elements included in the layout plan may relate to a street, a side of the street, a crossing, an intersection, a park area, a floor, a corridor and/or a room, etc. At least part of the layout plan may be stored in a memory of the node. The layout plan and/or the layout elements may be limited to the neighborhood of the node, so that the amount of information to be stored is kept to a minimum. Thus, retransmission may be conditioned upon a common layout element. These means enable the overall application behavior to be improved through the use of local layout information and mapping of nodes onto the layout plan.

Preferably, at least part of the layout plan with the corresponding layout elements is uploaded to the node during commissioning or initialization of the network. In addition, the node may be provided with at least one of a position of the node with respect to the layout plan, a primary layout element associated with the node and neighborhood information. The node may include a spatial unit for determining an absolute position of the node, e.g. a GPS position, and/or a relative position with respect to layout elements or other nodes. Then, the node may be adapted to determine its primary layout element and possibly also further secondary layout elements associated with the node. Alternatively, the node may identify secondary layout elements, e.g. by analyzing beacon messages from other nodes. In the picture of a street lighting system, the primary layout element may relate to the street in which the node is located, and the secondary layout elements may relate to other streets intersecting with that street or other streets close to the node. In addition, the node may determine, or may be provided with, information about layout parameters, e.g. its position with respect to the primary layout element, the side of the street, the curvature of the street at the node position, distance to a next crossing or other streets, and the like. Moreover, the node may be informed about absolute and/or relative positions of neighbor nodes, possibly, their position may already be included in the uploaded layout plan. Alternatively or additionally, the node may learn about neighbor nodes by exchanging neighborhood information, e.g. using beacon messages.

In one embodiment, the received message may be forwarded by the node only if the transmitting node and the receiving node have at least one layout element in common. In other words, the receiving node may be configured to drop a received message, if all layout elements associated with the transmitting node are different from those associated with the receiving node. In a further embodiment, the message may only be retransmitted if the receiving node determines that the transmitting node and/or the originator node have the same primary layout element as said receiving node. In the example of a street lighting system, when a node has been triggered by a detection event and sends a trigger or detection message to its neighbor nodes, only nodes of the same street may forward the message, thus avoiding unnecessary retransmissions. This embodiment may be combined with hop-count bounding or geographical bounding. However, pure hop-count flooding or geographically bounded flooding could not achieve the above-described result, since this addresses all nodes in a radius.

The decision about retransmission may be based on at least one of an indicator included in the received message, layout parameters of the node and neighborhood information. Here, the indicator may include information related to the transmitting node, e.g. a node identifier of the transmitting node, at least one identifier of a layout element associated with the transmitting node, a position of the transmitting node, and the like. The indicator may also include additional layout information or layout parameters of the transmitting node. In the example of a street lighting system, this could be a position of the transmitting node with respect to a layout element of the transmitting node, e.g. the side of the street, on which the transmitting node is located, the proximity to a street junction, etc. The layout parameters may also relate to a property of the layout element at the position of the transmitting node, e.g. a curvature of the street etc. These means enable received messages to be filtered based on side of the streets and/or street shape. Hence, the receiving node may be configured to determine which layout elements it has in common with the transmitting node, based on an indicator included in the received message. Alternatively or additionally, the forwarding decision may be based on layout parameters of the receiving node itself, such as a position of the receiving node with respect to a layout element associated therewith, a property of the layout element associated with the receiving node at the position of the receiving node, etc. Also, the receiving node may decide about retransmission, based on a comparison of layout parameters of the receiving node and of the transmitting node. For instance, the node may be configured to decide for a retransmission, if it is located on the same side of the street as the transmitting node and/or the triggered node. This may be advantageous if only one side of the street needs to be illuminated. Then, unnecessary retransmissions are avoided, thus reducing the data load on the network. In another example, a node located close to a street bend may also decide to forward a received message if it is located on the other side of the street than the transmitting node and/or the triggered node. These means enable the reliability of data transmission to be increased even at problematic spots of the network. Moreover, neighborhood information may be stored at the node, e.g. including at least one of identifiers of neighbor nodes, positions of neighbor nodes, identifiers of layout elements associated with the respective neighbor nodes, additional layout information about the neighbor nodes and the like. This information may be stored as a list in the node and may either be uploaded during commissioning or exchanged between the neighbor nodes using beacon messages or the like. By means of the neighborhood information, the node may identify layout elements or layout parameters of the transmitting node, using a node identifier or a node position of the transmitting node included in the received message. This allows reducing the amount of required data in the message.

In a further embodiment, the node may be configured to consider a number of layout elements associated with it in the decision of retransmission. Here, the node may choose a retransmission mode based on the number of layout elements. Preferably, the node is configured to decide to retransmit the received message when said node is associated with more than one layout element. This would for instance be the case for a luminaire node at a street junction. These means enable the retransmission of the message to be spread to layout elements other than the one(s) associated with the triggered node. In case of only one associated layout element, the receiving node may choose a retransmission mode based on a probabilistic approach, i.e. the message is retransmitted with a certain probability. This retransmission probability may depend on layout parameters of the receiving node and/or of the transmitting node, e.g. a distance to the originator node, by which the message was originally sent, a distance to layout elements such as a junction or the like, a curvature of a street bend at the node position, a number of associated layout elements and the like. For instance, the larger the distance to the triggered node or to the originator node, the higher the retransmission probability may be. Likewise, the larger the number of layout elements associated with the node, the higher the probability for retransmission may be. Also, the number of layout elements associated with the receiving node may influence the retransmission probability. Additionally or alternatively to the probabilistic approach, the retransmission mode may include a counter-based approach, in which the retransmission probability is based on a number of message retransmissions of neighbor nodes overheard within a predetermined time period. This predetermined time period may be set based on layout parameters of the node and/or of the transmitting node, e.g. a distance to the triggered node, by which the message was originally sent, a distance to layout elements, such as a junction or the like, a curvature of a street bend at the node position and the like, and/or on the number of layout elements associated with the node. For instance, the more layout elements are associated with the node, the smaller the predetermined time period may be. Of course, this may be combined with other criteria, such as hop-count bounding or geographical bounding.

In a preferred embodiment, the node may be further configured to consider, in the forwarding decision-making process, coverage of a received message transmission and/or retransmission. When receiving a retransmission of the message from a neighbor node, the node may determine the coverage of the retransmission, e.g. based on an indicator included in the retransmitted message and/or on stored neighborhood information including an identifier of at least one layout element associated with the respective neighbor node. Also here, the indicator may include information related to the transmitting node, e.g. a node identifier of the transmitting node, at least one identifier of a layout element associated with the transmitting node, a position of the transmitting node, and the like. For instance, when a node identity of the neighbor node is included, the node may check the stored neighborhood information as to how many layout elements are associated with the respective neighbor node. Similarly, if a position of the neighbor node is included in the received retransmission of the message, the node may determine the number of layout elements associated with this neighbor node, using the layout plan. If the node has no additional layout element, i.e. a layout element not associated with the neighbor node, it may decide to drop the message. In this case, a retransmission by the node would only reach nodes that are already covered by the retransmission of the neighbor node. Preferably, in case that the node has at least one layout element different from the one or more layout elements of the neighbor node, the node may decide to also retransmit the message. In this case, the node may retransmit the message including an indicator excluding the common layout elements from a further retransmission. Thus, the efficiency of data transmission is increased. In case that the node is associated with more than one layout element, only retransmissions of neighbor nodes also associated with more than one layout element may be considered. In one embodiment, more than one layout element may refer to more than one layout element other than the primary layout element of the transmitting node, i.e. other than the one from which the transmitting node has sent the message. A node associated with more than one layout element will be referred to as key forwarding node in the following. These means enable redundancy to be leveraged for further reduction of retransmissions at key forwarding nodes.

Furthermore, the node may be configured to determine a covered distance from the triggered node that is actually travelled by the message, using the layout plan, i.e. a travel distance. Thus, a geographical and/or covered distance may be considered by the node, when deciding about retransmission of a received message. Additionally or alternatively, a distance field with the covered distance may be included in the message and updated by each forwarding node. That is to say, the node may add its geographical distance from the transmitting node to the value included in the distance field. Therefore, the distance field of the message may indicate the travelled or covered distance from the triggered node. Of course, instead of covered distances, also geographical distances, Euclidian distances or line-of-sight distances may be used. These means enable a distance limit to be considered for the retransmission.

In a preferred embodiment, the node is associated with a luminaire of a lighting system, such as an outdoor lighting system or street lighting system or an indoor lighting system, e.g. employed in large buildings. Preferably, the luminaire is activated upon receiving a trigger message, i.e. a lighting unit of the luminaire may be lit up. Alternatively, the node may be associated with a node of a sensor system, e.g. a traffic sensing system or emergency sensing system.

According to another aspect of the invention, a system for operating a wireless network is provided, the system including a plurality of nodes of the network according to any one of the above-described embodiments. In particular, the system may relate to a telemanagement lighting system set up as a wireless mesh network.

According to still another aspect of the invention, there is provided a method of controlling a node of a wireless network, which node is associated with at least one layout element of a layout plan, wherein after a message from a transmitting node is received at a receiving node, a decision is made about retransmission of the received message, based on whether the transmitting node and the receiving node have at least one layout element in common. The layout plan including the layout elements may be stored in the node. For the method according to the present invention, any of the above embodiments described for the node may be adapted accordingly. Thus, the method may be performed by means of a node according to any one of the described embodiments. According to the present invention, a proper trade-off between overhead of information exchange and transmission reliability can be provided.

BRIEF DESCRIPTION OF THE DRAWINGS

In the figures:

FIGS. 5A and 5B illustrate street topologies.

FIGS. 6A, 6B and 6C show, respectively, a flowchart of a method of making a forwarding or retransmission decision at a receiving node according to further embodiments of the present invention.

DETAILED DESCRIPTION

Preferred applications of the present invention are actuator networks, sensor networks or lighting systems, such as outdoor lighting systems (e.g. for streets, parking lots and other public areas) and indoor lighting systems (e.g. malls, arenas, parking garages, stations, etc.). The present invention is in particular suited for wireless telemanagement solutions of networked outdoor/indoor lighting systems and/or sensor-based lighting control. However, other applications may be intelligent traffic systems and applications such as incident warning systems. In the following, the present invention will be described by means of an example of an outdoor lighting system, i.e. a street lighting system, in which nodes of the network are associated with luminaires distributed along streets and at junctions. Yet, the present invention is not limited to this application.

Figure 1:
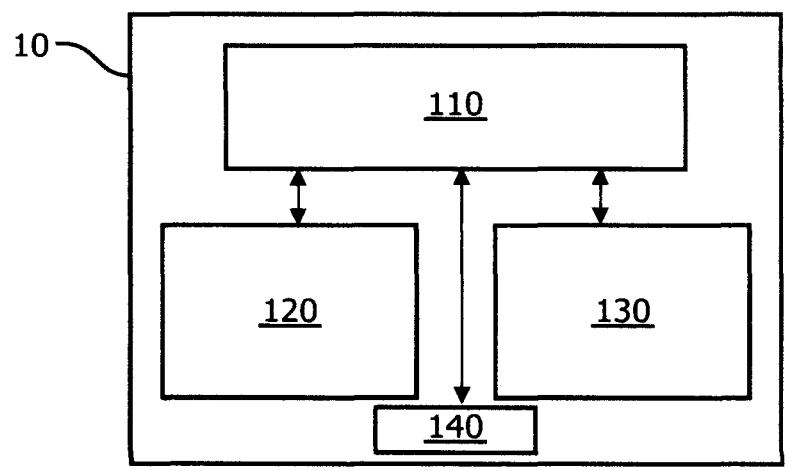
FIG. 1 illustrates a node for a wireless network according to an embodiment of the invention.

In FIG. 1, an example of a node 10 is shown. The node includes a control unit 110, a memory 120 for storing data in the node 10 and a transmitting/receiving unit 130 for transmitting or receiving data within the network. Optionally, the node 10 may also include a spatial unit 140 for determining its node position, e.g. a GPS position. The node 10 can be associated with a luminaire of the street lighting system.

Figure 2:
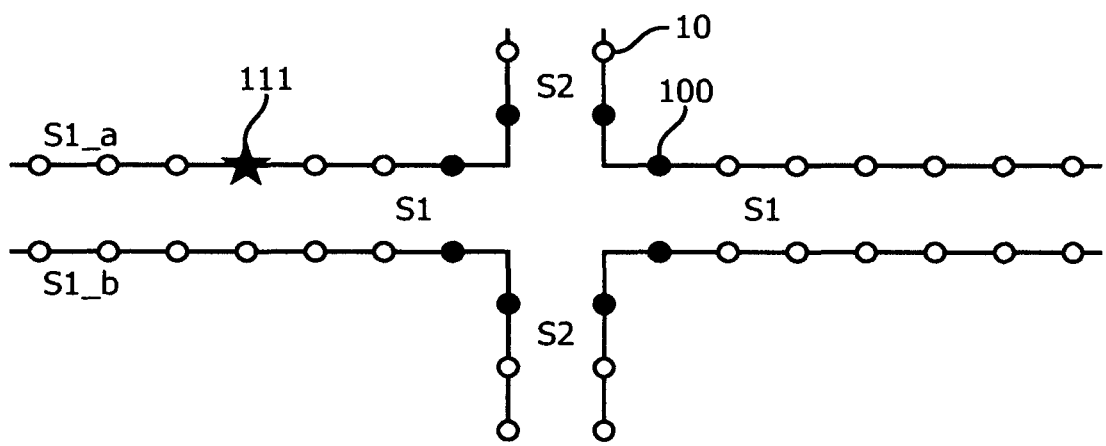
FIG. 2 illustrates a wireless network according to an embodiment of the invention.

In FIG. 2, a part of a wireless network of a street lighting system is exemplified by means of two streets S1 and S2, which cross each other. Nodes 10 are located on either side of both streets, e.g. on the upper side S1_a of street S1 or the lower side S1_b thereof.

Figure 3:
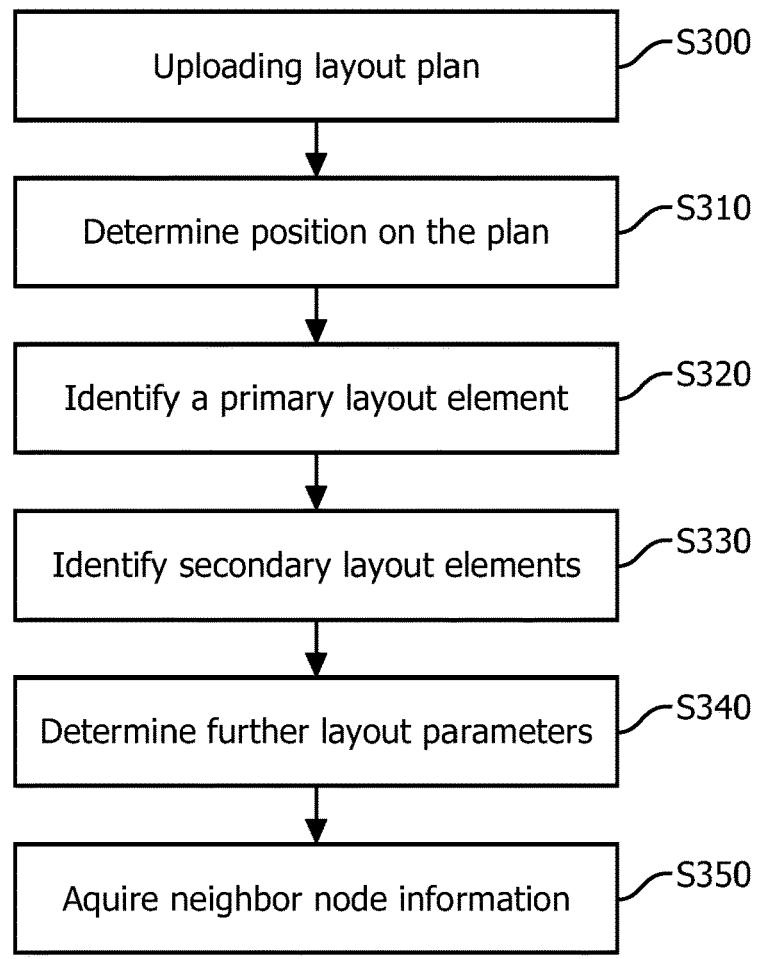
FIG. 3 shows a flowchart illustrating a method of setting up a node according to the present invention.

FIG. 3 illustrates a further method of initially setting up the nodes 10 according to the present invention, e.g. during a commissioning or initialization phase of the network. First, a layout plan is provided to the node 10 (S300). The layout plan may be restricted to the geographical vicinity of the node and therefore will not require a significant amount of storage space in the node 10. In addition, further layout information may be provided to the node 10, such as an exact or estimated number of nodes 10 associated with layout elements in its surroundings, that is, the number of nodes 10 on each represented street of the layout plan. The node 10 may determine its position on the layout plan (S310), e.g. using the node position determined by the spatial unit 140 of the node or using a node position uploaded to the node 10 together with the layout plan. The node 10 then identifies its primary layout element (S320), e.g. the street on which it is located or the street and the side of the street. For node 111 in FIG. 2, the primary layout element is street S1, or when the sides of the street are considered as constituting layout elements, S1_a is the primary layout element. By measuring its distance relative to other intersecting streets, the node can also identify whether it should consider itself to be associated with further secondary layout elements (S330). Such is the case for the nodes 100 in FIG. 2 (filled circles), which should be associated with both streets S1 and S2. If a node 100 is associated with more than only its primary layout element, i.e. if it is also associated with secondary layout elements, it is denoted as a key forwarding node 100 (filled circles in FIG. 2). It is preferred that only streets intersecting with the primary street of a node 10 are determined as secondary layout elements. Optionally, step S340 is performed, in which the node may determine further layout parameters such as its position with respect to its primary layout element (e.g. the relative position on its primary street, a side of the street, etc.), a distance to a further layout element (e.g. to the next intersection), properties of its layout elements with respect to the node position (e.g. curvature or slope of the street at the node position) and the like. Thus, the node 10 can determine whether it lies in the middle of the street or closer to an intersecting street (without necessarily being a key forwarding node) or on which side of the street it is located. In a next step S350, the node may acquire neighbor node information, e.g. through an exchange of local neighborhood information between the nodes or by using uploaded neighborhood information. These means enable the node 10 to determine the positions of its neighbor nodes 10 on the layout plan and identify their associated layout elements. Thus, each node 10 of the network may store a list of its neighbor nodes and corresponding information, such as at least one of layout elements associated with the respective neighbor node, a node position of the respective neighbor node, a node identifier of the respective neighbor node and additional layout information about the neighbor node. Alternatively, the nodes 10 determine the layout elements of their neighbor nodes and additional layout information corresponding to the neighbor nodes, using a node position of the respective neighbor node and the layout plan. The additional layout information may include layout parameters of the neighbor node, such as side of the street or street curvature, or whether the neighbor node is a key forwarding node. This enables nodes 10 to be identified that are of high importance in message forwarding processes, such as key forwarding nodes 100. Thus, nodes 10 may be clustered and may exchange information with their neighbor nodes about geographically close visible clusters. This information can be locally used to verify whether all known clusters are covered and whether a retransmission of a message is necessary. These means enable retransmission (also: rebroadcast or forwarding) to be managed based on criteria such as street memberships, which side of a street a node 10 belongs to, probabilistic criteria, distance to a trigger node or last transmitting node, etc.

Figure 4:
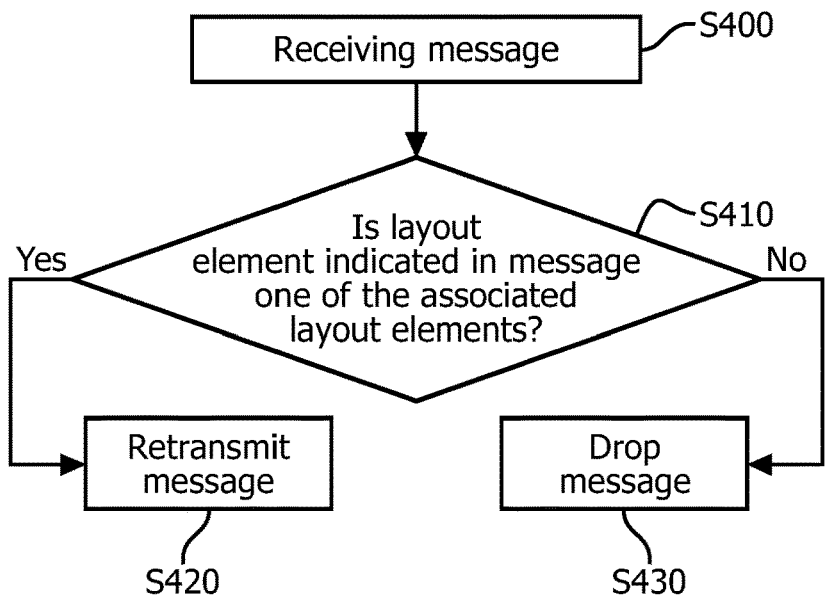
FIG. 4 shows a flowchart illustrating a method of making a forwarding or retransmission decision at a receiving node according to one embodiment of the invention.

In a light-on-demand application, when a node 111 (see FIG. 1) is triggered to transmit a trigger message, the triggered node 111 can choose to include the identifier S1 of the layout element (street) it belongs to. According to the method shown in FIG. 4, any node 10 overhearing the message (S400) determines whether the layout element identified in the message is one of its associated layout elements (S410). If the node 10 is not associated with the identified layout element, it may then filter out the message and drop it (S430), thus avoiding an additional retransmission. Nodes 10 with the same layout element may retransmit the message (S420) and are preferably also activated. Hence, retransmission can be conditioned on the identity of a layout element. This may be of high importance when streets run parallel to each other, as shown in FIG. 5A, or when parts of streets are close to each other, without the streets crossing each other, as shown in FIG. 5B, or in case of layered streets crossing over or under each other, which are in direct line-of-sight to each other, as is the case at interchanges, bridges or tunnels. In this case, only nodes 10 of the indicated street are activated, but the activation does not spread to adjacent streets. A transmission protocol only based on hop-count or geographically bounded flooding would fail in such a case, since this would address all nodes 10 within a radius.

In FIG. 6A, another method of deciding about retransmission according to a further embodiment of the present invention is shown. In this approach, when a node 10 receives a message (S500), it will first determine whether itself and the node 10 that transmitted the message, i.e. the transmitting node, have at least one layout element (e.g. street) in common (S510). For this purpose, the transmitting node 10 preferably includes its node identifier in the message. Alternatively or additionally, the transmitting node 10 may include its node position and/or identifiers of its associated layout elements in the message. Then, the receiving node 10 may use stored neighborhood information and a list of layout elements it belongs to. Alternatively, the node 10 may determine the layout elements of the transmitting node, using the layout plan, together with the node position of the transmitting node. If there exists at least one common layout element, the node 10 may decide to retransmit the message (S520). If this is not the case, the node 10 may drop the message without further retransmission (S530). By virtue of these means, the forwarding of the message is not limited to one street, as the message can be forwarded to all streets intersecting with the primary street, in which the trigger node 111 is located. Since, in the situation where a car approaches a crossing, it cannot be decided in advance which way the car will go, this is advantageous to activate the luminaires of all intersecting streets. However, in a variant of this method, it may be required for a retransmission that not only the transmitting node has a layout element in common, but also that the triggered node 111 has a common layout element as well. This can be checked in step S510 using a node identifier, node position or identifiers of the layout elements associated with the triggered node, at least one of which may be included in the message. This variant would limit the retransmission to nodes 10 located in street S1 and to key forwarding nodes 100 associated with street S1 in the example of FIG. 2.

Figure 6B:
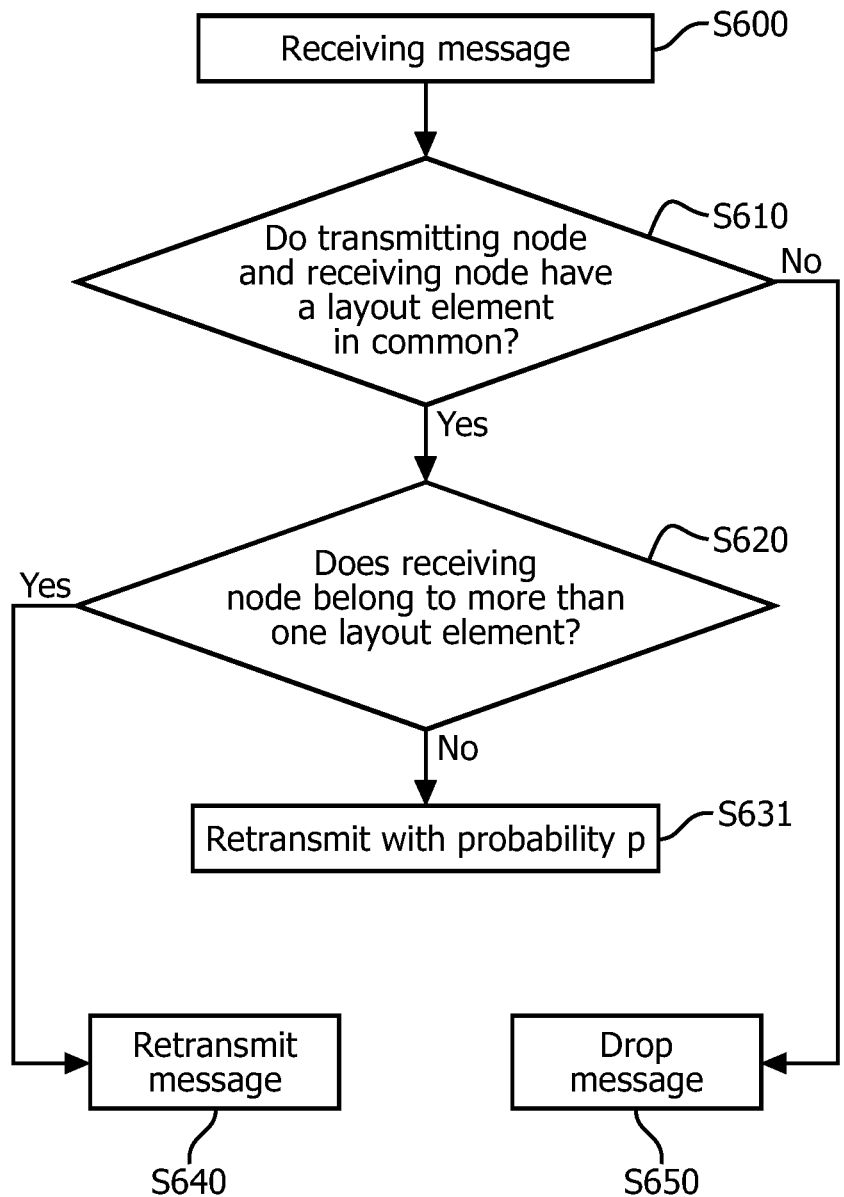

The approach illustrated in FIG. 6A can be further refined to include a probabilistic retransmission based on a number of layout elements a node 10 is associated with, as shown in FIG. 6B. In step S600, the node 10 receives a message, such as a trigger message. Then, it checks whether it has layout elements in common with the transmitting node (and/or with the triggered node 111) in step S610. If so, the message will be a candidate for retransmission, if not, the message is dropped (S650). In step S620, the node 10 determines whether it has more than one associated layout element, i.e. whether it is a key forwarding node 100. If so, it will retransmit the message (S640). If it has only one associated layout element, e.g. the street in which also the transmitting node (and/or the triggered node 111) lies, the node 10 may apply a probabilistic approach to retransmitting the message or not (S631). For instance, the node 10 decides to retransmit with a probability p of 50%. This may be referred to as a gossiping approach. In another example, the probability p of retransmission may be weighted based on layout parameters of the receiving node 10, such as a distance to the next intersection, a distance from the triggered node 111, a distance to the next key forwarding node 100, a degree of curvature of the street at the position of the node, and the like. Then, the probability p of forwarding the message may be higher according as the node 10 is closer to the next intersection or the distance from the triggered node is larger, i.e. the larger the distance already travelled by the message.

Figure 6C:
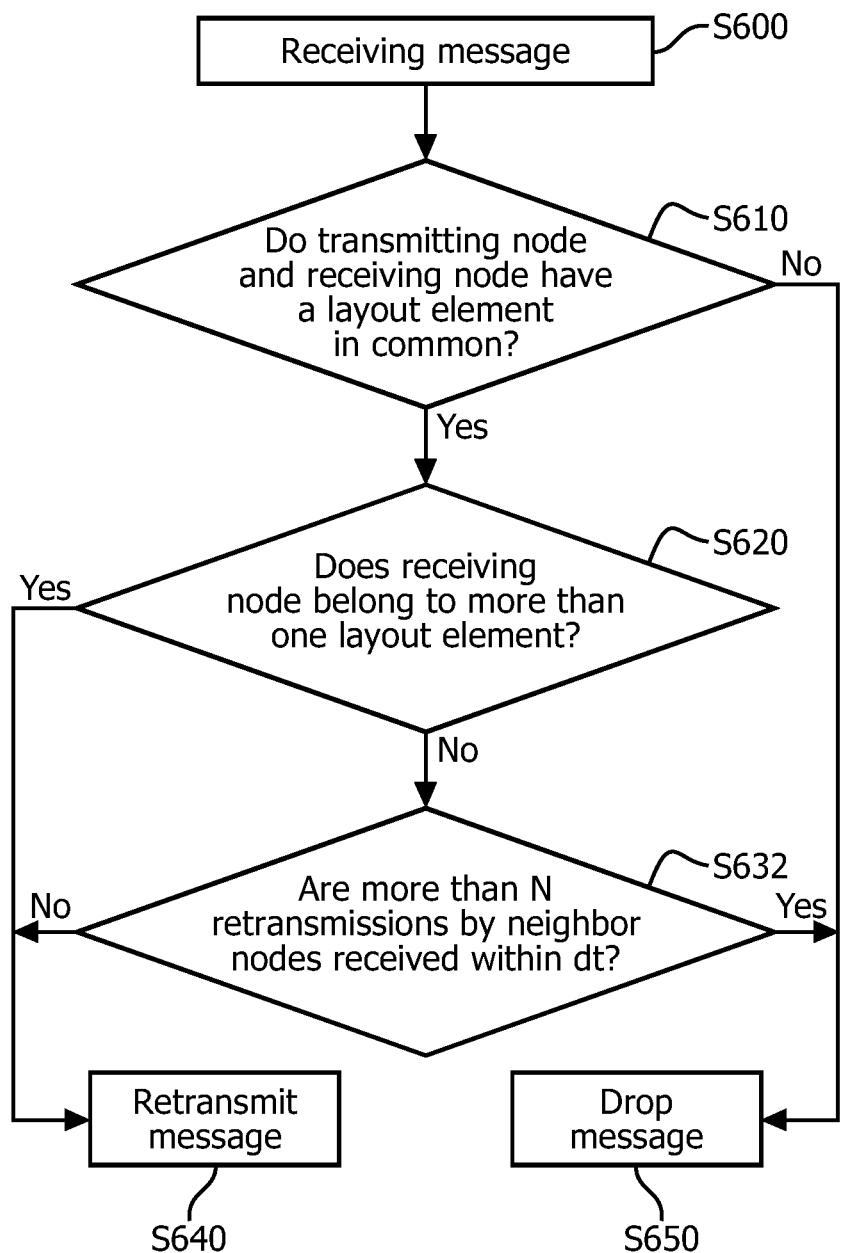

In a further embodiment of the method of making a forwarding decision at the receiving node shown in FIG. 6C, a counter-based approach is applied based on the number of layout elements associated with the receiving node. In this approach, steps S600, S610 and S620 may be the same as described for the probabilistic approach shown in FIG. 6B. That is, after the node 10 has received a message (S600), it determines (S610) whether it has at least one layout element in common with the transmitting node (and/or triggered node 111). If so, it determines whether it is associated with more than one layout element (S620). In case the node 10 only has one associated layout element, i.e. belongs only to one street, the node 10 may apply a wait and cancel mechanism: The node 10 waits for a given time period dt in order to receive or not receive retransmissions of the message from neighbor nodes 10 (S632). If, during this time dt, it hears a certain defined number N of its neighbor nodes retransmitting the message, it will not proceed with its forwarding attempt and drop the message (S650). Otherwise, it will retransmit the message in step S640. Instead of simply retransmitting the message in step S640, also the probabilistic approach described above for step S631 can be applied. The parameters dt and N may be adjusted at each node 10 depending on its layout parameters, such as the distance between the node and the triggered node 111, the distance to the next intersection, the distance to the next key forwarding node 100, a degree of curvature of the street at the position of the node, and the like. Optionally, after the node has received a retransmission from a neighbor node (S632), it may additionally determine whether the neighbor node is a key forwarding node. If so, the node may instantly drop the message (S650), since then a sufficient extent of retransmission may already be achieved. If it is determined that the neighbor node is not a key forwarding node, the node continues to wait (S632).

Figure 7:
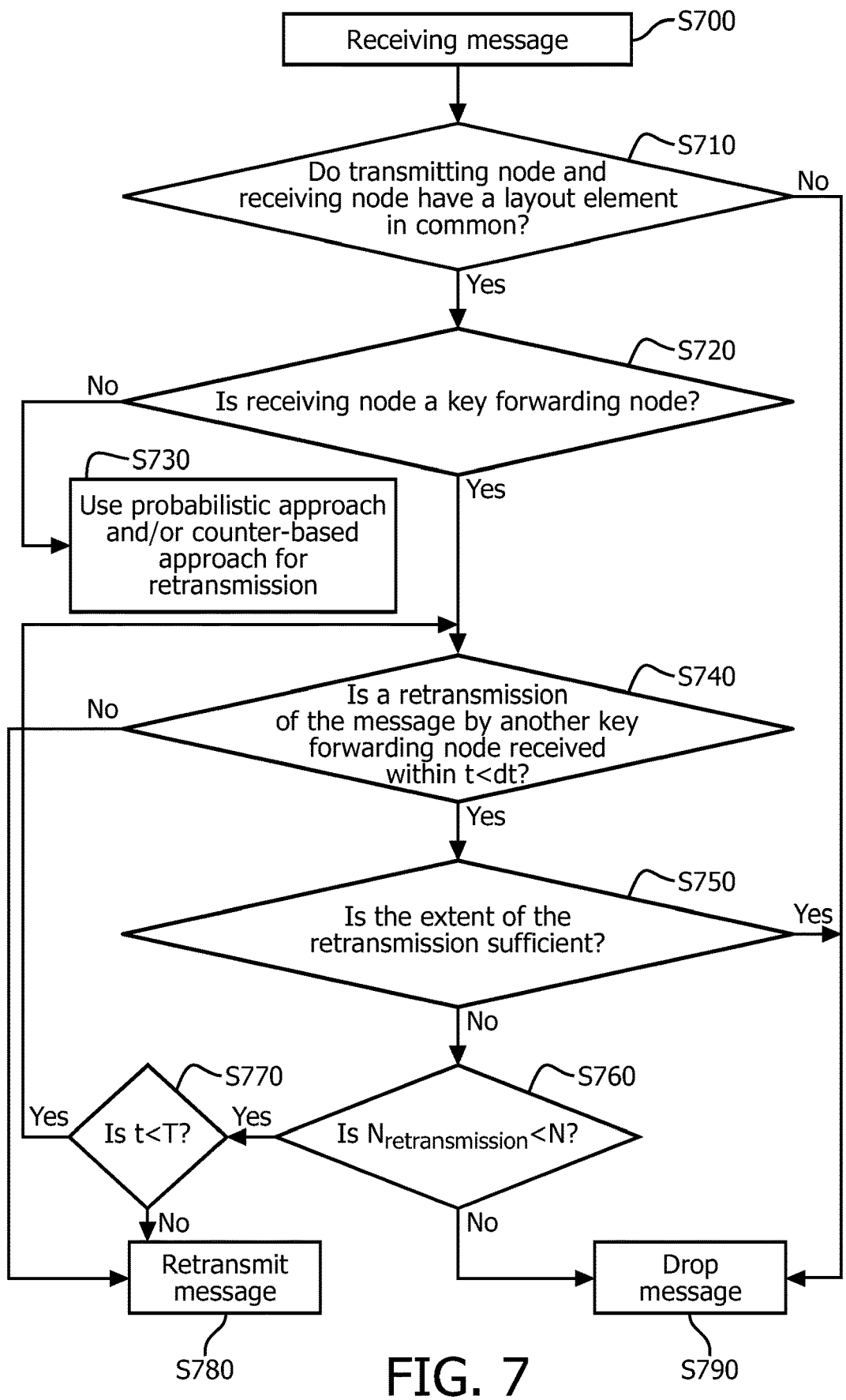
FIG. 7 shows a flowchart of a method of making a forwarding or retransmission decision at a receiving node according to a further embodiment of the present invention.

A flowchart of a further embodiment of a method of making a forwarding decision at a receiving node is shown in FIG. 7, wherein redundancy is leveraged for further reduction of retransmissions at key forwarding nodes 100. The amount of forwarding at the key forwarding nodes 100 might remain significant, since they are requested to retransmit every received message, provided that other conditions are met such as hop count limit or geographical limit. To reduce the load on the key forwarding nodes 100, load balancing between key forwarding nodes 100 lying at the same street intersections may be applied. For this purpose, every key forwarding node 100 may keep track of its direct neighbor nodes and map them on its layout plan for determining which streets they belong to. Additionally or alternatively, the nodes may also exchange neighborhood information for informing their neighbor nodes about the streets they can contact and how many nodes in that street they can actually communicate with. This may be completed in the commissioning or initialization phase.

Thus, as described hereinabove with reference to FIG. 6A, 6B or 6C, when a node receives a message (S700) and has determined that it has a layout element in common with the transmitting node (and/or triggered node 111, S710), it checks whether there is more than one layout element associated with it, i.e. whether it is a key forwarding node (S720). If this is not the case, the probabilistic approach described above for step S631 or the counter-based approach described above for step S632 may be applied in step S730. If the receiving node is a key forwarding node with which more than one layout element is associated, it waits for a time period dt in order to receive or not receive a retransmission of the message from another key forwarding node (S740). If it does not receive any retransmission from another key forwarding node, the message is retransmitted (S780). If it does, the node determines the coverage of the retransmission from the other key forwarding node (S750). For this purpose, the node may use stored neighborhood information or it may determine the coverage using the layout plan and the node position of the other key forwarding node. Thus, the node can determine which layout elements, e.g. streets, are covered by the retransmission of the other key forwarding node. If this coverage is sufficient, it will drop the message (S790). If the coverage is not sufficient and if a predetermined time limit T from the instant of receiving the message has not been exceeded (S770), the node may wait again for a further amount of time dt in order to receive or not receive a retransmission from another key transmitting node (S740). The time periods dt may be randomly set and thus do not have to be the same for each iteration. If the node determines that the time limit T has been exceeded, without sufficient extent of retransmission, the message is retransmitted (S780). Optionally, after having determined that the extent of retransmission by the other key forwarding node is not sufficient (S750), the node may determine, in step S760, how many retransmissions of the message it has heard. Here, the node may either consider all received retransmissions or only those from other key forwarding nodes. If the number of retransmissions reaches a certain amount, i.e. equals N or higher, the message is dropped (S790). If the number of retransmissions is less than N, the node determines whether the time limit T has already passed (S770).

In a further variant of these methods, the node may limit the retransmission of the message (S640, S780) to layout elements that have not yet been covered by other retransmissions. The coverage may be determined as described above for identifying the layout elements associated with the transmitting node from which the message was received. For limiting retransmission by the node, the node may include in the retransmission of the message an indicator indicating, e.g., identifiers of the layout elements associated with the node which are still to be covered, or identifiers of the layout elements associated with the node which should be excluded from retransmission. Then, when receiving this retransmitted message including the indicator, the receiving node may check, after having determined that it has a common layout element (S610, S710) with the transmitting node, whether all of its associated layout elements are excluded from retransmission, based on the indicator included in the message. If so, the message is dropped (S650, S790). If not, the node proceeds with the further steps (S620, S720). Of course, the node may alternatively determine whether at least one of its associated layout elements is indicated to be covered. If this is not the case, the message is dropped (S650, S790). But if this is the case, the node proceeds with the further steps (S620, S720).

Figure 8:
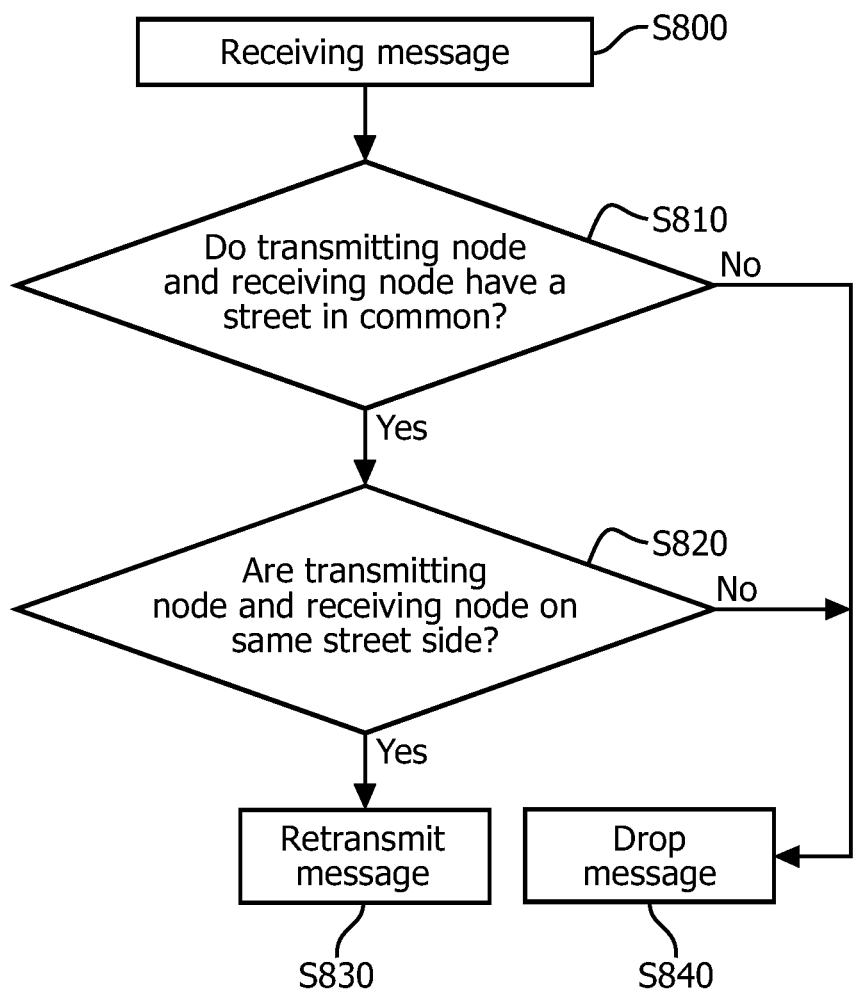
FIG. 8 shows a flowchart of a method of making a forwarding or retransmission decision at a receiving node according to a further embodiment of the present invention.

In FIG. 8, a further method of making a forwarding decision at a receiving node is illustrated, wherein messages may be filtered based on further layout parameters related to the layout element at the node position, e.g. based on sides of the street or sides of a corridor. Here, the originator node from which the message originally comes may choose to include an identifier of the layout element it is associated with and an indication of a further layout parameter, e.g. the corresponding side of the street or the side of the corridor. For instance, when a trigger event causes a node to transmit a detection or trigger message, the triggered node 111 may choose to include identifiers of the street (e.g. S1) it belongs to and the side of the street (e.g. a). Any node that does not lie on this side of the street will drop the message. Thus, when receiving the message from a transmitting node 10 (S800), the receiving node 10 determines whether it is on the street identified in the message (S810), and if so, whether it is on the side of the street identified in the message (S820). In case both conditions are fulfilled, it retransmits the message (S830). If not, the message is dropped (S840). This has, for instance, the effect that the number of luminaires required to light up is reduced to luminaires that lie on the side of the street where the object is detected. In addition to unneeded retransmissions being filtered, this approach also ensures that no lights that lie on completely different adjacent streets will be lit up, thus reducing application layer involvement in filtering out irrelevant detection messages.

Here, the side of the street may be considered as a layout parameter of the node 10. Alternatively, the side of the street of a certain street may be considered as a layout element of its own, so that it is possible to differentiate between left and right side of the same street. Of course, this embodiment may be combined with any of the preceding embodiments.

Figure 9:
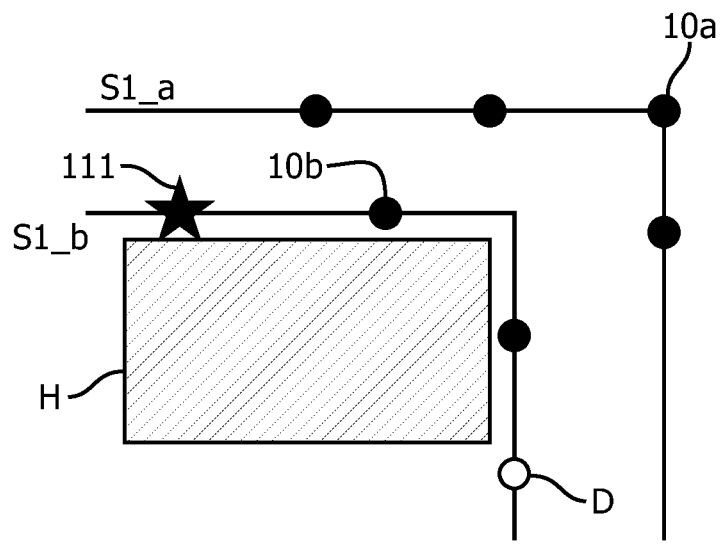
FIG. 9 illustrates a further street topology.

When a layout element, such as a street or a corridor, has curvatures or bends, it may be beneficial to allow nodes on the opposite side of the layout element of the originator node 111 to also retransmit the message. For instance, taking the example of a street bend as shown in FIG. 9, a building H may reduce the probability of successful transmission between nodes 10$b$ on the same side of the street S1_$b$. Hence, when forwarding a message from a triggered node 111 on the side of the street S1_$b$, the nodes 10$b$ may not be able to reach destination node D. Thus, the method shown in FIG. 8 may further include a step of checking further layout parameters of the node 10, e.g. whether the node 10 is located at a curvature of the layout element. If the node 10$a$ does not lie on the same side of the street S1_$b$ as the triggered node 111, but is located at a bend, it may retransmit the message despite lying on a different side of the street. These means enable the transmission reliability at problematic points of the layout plan to be increased. In order to reduce the total amount of retransmission, the node 10$a$ may adopt the probabilistic approach for retransmission, as described above. The probability p for retransmission may depend on the degree of curvature of the layout element and on the position of the node 10 relative to the curvature. Instead of the probabilistic approach, the above-described counter-based approach may be applied for retransmission, wherein the node 10$a$ may keep count of how many times it overheard the same message and, based thereon, decide whether to retransmit or drop the message.

Figure 10:
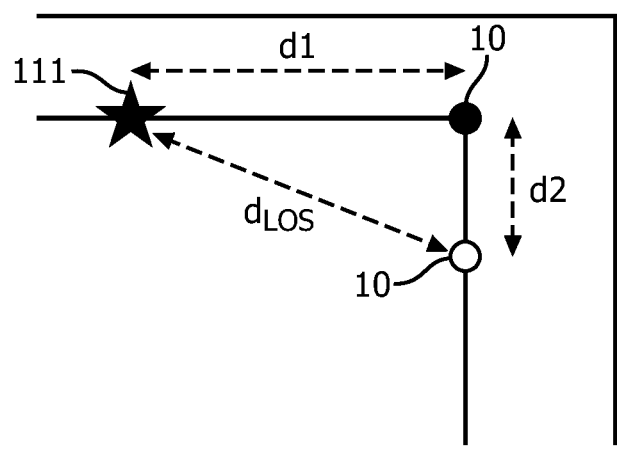
FIG. 10 illustrates a difference between a geographical distance and a Euclidian distance.

In FIG. 10, the difference between a line-of-sight or Euclidian distance versus an actual forwarding distance, i.e. the covered distance, is illustrated. A message may contain a distance limit, e.g. based on hop count or based on a line-of-sight distance. Then, it is required to cover only this distance from the originator node 111 and not to forward the message further. Using a line-of-sight distance limit, the distance is measured relative to the originator node 111 in a line-of-sight or Euclidian manner ($d_{LOS}$ in FIG. 10). However, the actual length of the path the message has taken during the forwarding process, i.e. the covered distance, is likely to be different from this line-of-sight distance, e.g. equal to d1 plus d2 in FIG. 10. The covered distance of a message may therefore rather relate to a sum of geographical distances between nodes which have transmitted the message. Thus, according to the present invention, a receiving node 10 may be capable of determining the actual distance the message has travelled from the originator node 111 using its layout plan. This value may then be compared to a distance limit that may either be included in the message or predetermined for the node 10. Alternatively, the message may contain a distance indicator that keeps track of the covered distance. At the originator node 111, the distance indicator indicates 0. Every time a node 10 determines that the message is to be forwarded, the node 10 adds its geographical distance from the transmitting node, from which it has received the message, to the distance indicator. Of course, instead of the geographical distance, also the Euclidian distance or the hop count may be used. After receiving the message, each node 10 may first check whether the distance limit has been exceeded or not. If the distance limit has been exceeded, the message will be dropped. These steps may be included in any of the above-described methods of making a forwarding decision at a receiving node. Hence, all methods may be combined with hop bounding and/or geographical and/or covered distance bounding of transmission propagation, in general potentially also with other networking protocols for optimization, e.g. geo-casting (i.e. flooding a geographically defined region).

If a node 10 of the network cannot be associated with any layout element, the node 10 may decide to either drop a received message or retransmit it, based on hop count or covered distance information included in the message. Alternatively or additionally, the node 10 may apply the above-described probabilistic approach or counter-based approach.

The present invention is tailored but not necessarily limited to deployment of nodes along street topologies, as in outdoor lighting networks. Hence, through the use of local street layout information and local characteristics, the overall application behavior can be improved, enabling the number of required transmissions to be reduced or ensuring that enough transmissions are made at critical geographical points to achieve message delivery. However, the present invention is also applicable to any deployment scenario where nodes are clustered, depending on certain criteria.

Generally, it has been shown that through the exchange of limited amounts of neighborhood information, the transmission reliability, e.g. by counter-based flooding, may be increased. These means enable a proper tradeoff between overhead of information exchange and transmission reliability. In particular, the present invention allows to optimize flooding algorithms in mesh networks, i.e. optimize the number of transmissions to cover multiple hops from origin to destination in an efficient manner, thus improving throughput performance and achieving congestion reduction. Furthermore, the reliability of message delivery can be increased compared to other probabilistic flooding approaches known from the prior-art, such as counter-based flooding. In addition, only a fixed small storage space is required for the local neighborhood information. The forwarding methods according to the present invention have a rather low fixed protocol overhead compared to other neighbor knowledge-based flooding and routing approaches. Moreover, in a localized broadcast and/or (dense) multicast communication, the present invention allows reducing the number of transmissions compared to flooding. The invention is particularly valuable in the presence of regulations that limit access of the nodes to the communication channel (duty-cycling requirements imposed on the fraction of time that the nodes are allowed to occupy the channel with their transmissions), since it allows distributing the transmission load evenly (if possible) in the case of multiple senders per group.

The invention claimed is:

1. A receiving node of a wireless network, comprising:
a hardware processor configured to decide about retransmission of a message received from a transmitting node, based on whether the transmitting node has at least one layout element of a layout plan in common with the receiving node,
wherein the layout plan relates to a spatial arrangement of the wireless network, and
wherein the at least one layout element of the layout plan is associated with the receiving node.

2. The receiving node according to claim 1, wherein the hardware processor is configured to retransmit the received message, only if the receiving node and the transmitting node have at least one layout element in common.

3. The receiving node according to claim 1, wherein the decision about retransmission is based on at least one of
an indicator included in the received message,
layout parameters of the receiving node and
stored neighborhood information.

4. The receiving node according to claim 3, wherein the indicator includes at least one of
an identifier of the transmitting node,
at least one identifier of a layout element associated with the transmitting node,
and
additional layout information about the transmitting node.

5. The receiving node according to claim 1, wherein the hardware processor is configured to decide about a retransmission mode of the received message, based on a number of layout elements associated with the receiving node.

6. The receiving node according to claim 5, wherein the retransmission mode includes at least one of:
a probabilistic approach and
a counter-based approach, based on a number of retransmissions of the message by neighbor nodes received within a predetermined time.

7. The receiving node according to claim 6, wherein at least one of a probability for retransmission and the predetermined time is set based on at least one of a distance to a layout element, a distance to an originator node, which has first sent the message, and a number of layout elements associated with the receiving node.

8. The receiving node according to claim 1, wherein when at least one of a retransmission and transmission of the message is received from a neighbor node, the hardware processor is configured to decide about retransmitting the message, based on a coverage of at least one of the retransmission and transmission of the neighbor node.

9. The receiving node according to claim 8, wherein the coverage is determined based on at least one of:
an indicator included in the retransmitted message and
stored neighborhood information.

10. The receiving node according to claim 8, wherein if the receiving node is associated with more than one layout element, only retransmissions of neighbor nodes that are also associated with more than one layout element are considered.

11. The receiving node according to claim 1, wherein the hardware processor is configured to determine at least one of a geographical and covered distance travelled by the received message, using the layout plan, and to decide to retransmit the message if the determined distance is within a predetermined distance limit.

12. The receiving node according to claim 1, wherein the receiving node further comprises a spatial processor for determining at least one of an absolute position of the receiving node and a relative position of the receiving node.

13. The receiving node according to claim 1, wherein the receiving node is included in a luminaire of at least one of an outdoor and indoor lighting system.

14. The receiving node according to claim 1, wherein the hardware processor is configured to implement the retransmission of the message in response to determining that the transmitting node has the at least one layout element of the layout plan in common with the receiving node.

15. The receiving node according to claim 14, wherein the layout plan includes at least one of: a city map, a plant layout, and a floor plan, and wherein the layout element includes at least one of a floor, a corridor, a room, a street, a crossing and a park area.

16. The receiving node according to claim 14, wherein the at least one layout element includes a passageway in said layout plan.

17. The receiving node according to claim 1, wherein the layout plan indicates the spatial arrangement.

18. A method of controlling a receiving node of a wireless network, the method comprising the steps of:
- receiving a message from a transmitting node by the receiving node;
- deciding about retransmission of the received message, based on whether the transmitting node and the receiving node have at least one layout element of a layout plan in common,
- wherein the layout plan relates to a spatial arrangement of the wireless network, and
- wherein the at least one layout element of the layout plan is associated with the receiving node.

19. The method according to claim 18, further comprising implementing the retransmission of the message in response to determining that the transmitting node has the at least one layout element of the layout plan in common with the receiving node.

20. The method according to claim 18, wherein the layout plan indicates the spatial arrangement.

* * * * *